United States Patent
Wittkopp et al.

(10) Patent No.: US 7,070,535 B2
(45) Date of Patent: Jul. 4, 2006

(54) SHIFT MECHANISM FOR A MANUAL PLANETARY TRANSMISSION

(75) Inventors: Scott H. Wittkopp, Ypsilanti, MI (US); Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 83 days.

(21) Appl. No.: 10/851,391

(22) Filed: May 21, 2004

(65) Prior Publication Data

US 2005/0261104 A1    Nov. 24, 2005

(51) Int. Cl.
    *F16H 3/44* (2006.01)
(52) U.S. Cl. .................. 475/303; 74/473.1; 74/473.36; 74/335; 74/473.24; 74/473.25
(58) Field of Classification Search ............... 74/473.1, 74/473.36, 335, 473.24, 473.25; 475/303
    See application file for complete search history.

(56) References Cited

U.S. PATENT DOCUMENTS

| 3,495,473 | A | * | 2/1970 | Willis | 74/473.24 |
| 3,757,598 | A | * | 9/1973 | Van Dest | 74/473.3 |
| 4,621,536 | A | * | 11/1986 | Takeuchi | 74/473.1 |
| 4,920,815 | A | * | 5/1990 | Reynolds | 74/335 |
| 5,285,694 | A | * | 2/1994 | Chene | 74/473.24 |
| 6,835,157 | B1 | * | 12/2004 | Haka | 475/269 |

* cited by examiner

*Primary Examiner*—Rodney H. Bonck
*Assistant Examiner*—Justin K. Holmes
(74) *Attorney, Agent, or Firm*—Christopher DeVries

(57) ABSTRACT

A plurality of shift rails are manipulated by a manual control rod to selectively actuate one or more synchronizer mechanisms. The control rod is moved angularly and linearly during ratio selection. Each synchronizer mechanism may control two or more drive ratios in a planetary transmission. At least two of the rails are interconnected by a reversing mechanism to permit consistent movement of the rails regardless of the direction of movement of the control rod.

5 Claims, 4 Drawing Sheets

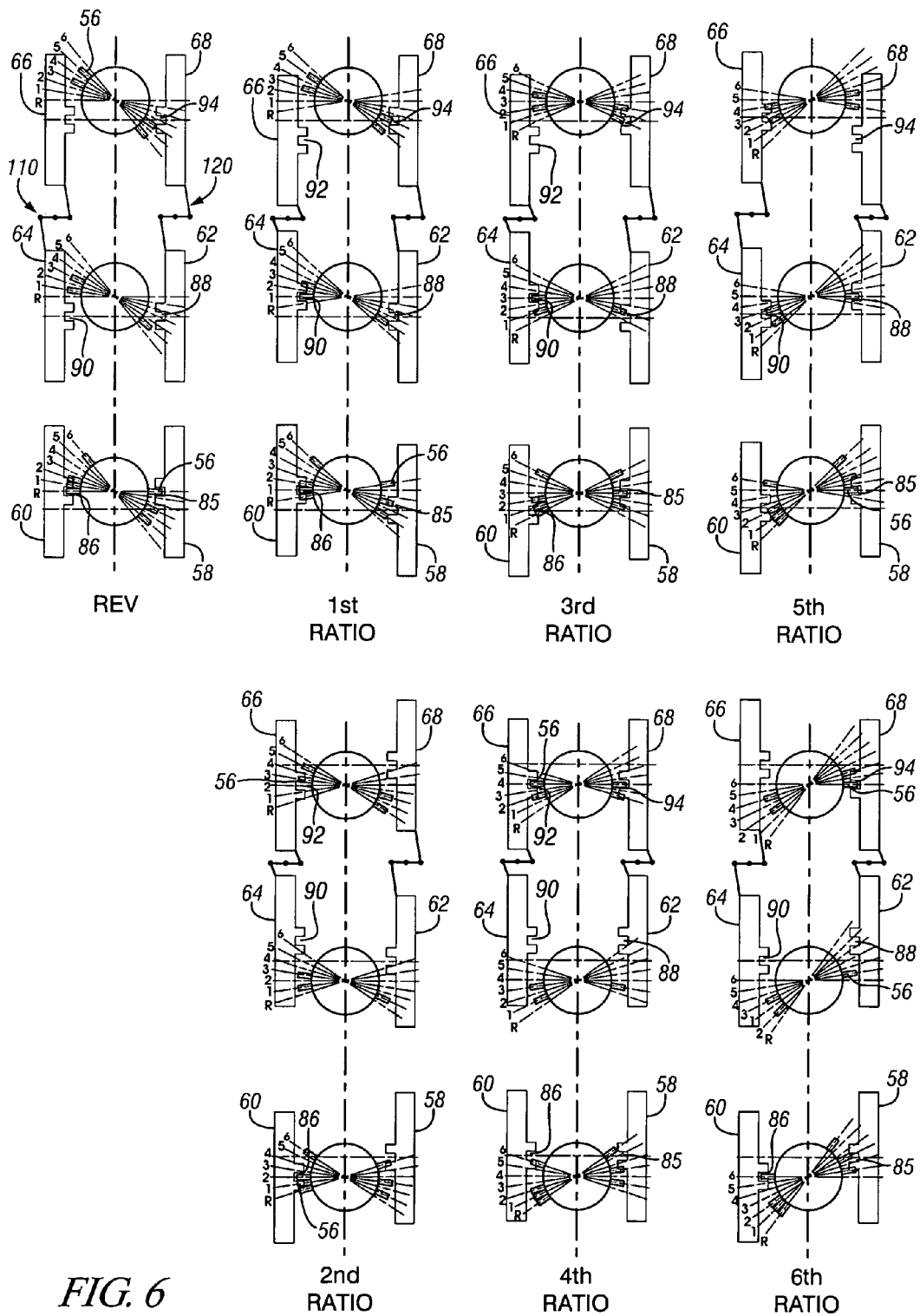

SHIFT MECHANISM FOR A MANUAL PLANETARY TRANSMISSION

TECHNICAL FIELD

This invention relates to transmission controls and, more particularly, to shift mechanisms for manual planetary transmissions.

BACKGROUND OF THE INVENTION

Passenger vehicles on the market today have a power transmission in the powertrain to provide multiple ratios between the engine and the driving wheels. Manual transmissions are employed in these vehicles because they provide more efficient powertrain usage due to the reduction in the amount of parasitic losses in the transmission.

Planetary transmissions are considered because of the lower cost of the gearing relative to countershafts in the normal manual transmission. However, the overall cost of automatically shifting a planetary transmissions is higher due to the increased complexity of the control mechanisms and the need for a pressurized hydraulic control system. Therefore, it is considered wise to combine a planetary-type transmission with synchronizer-type clutches and brakes for controlling the gear ratios. However, when employing synchronizers as the torque-transmitting mechanisms in planetary transmissions it is necessary to engage two or more of the torque-transmitting mechanisms simultaneously in order to produce a usable drive ratio within the planetary gear arrangement.

As set out above in more conventional automatic transmissions, the torque-transmitting mechanisms are fluid-operated devices controlled by a plurality of valves and electronic controls, which permit selected actuation and deactuation. Manual transmissions, however, employ synchronizers, which are mechanical in nature and generally controlled by a shift rail, which is manipulated by the operator. With manual planetary transmissions, as set forth above, it is necessary to engage or disengage two synchronizers to establish a drive ratio through the planetary arrangement.

Mechanical shift control mechanisms that will perform such a function are shown in U.S. Ser. No. 10/443,451, filed May 22, 2003, and U.S. Ser. No. 10/666,148, filed Sep. 18, 2003, both in the name of Haka and assigned to the assignee of the present application.

SUMMARY OF THE INVENTION

It is an object of the present invention to provide an improved manual control mechanism in a power transmission.

In one aspect of the present invention, a transmission control has a single manual input rod, which is effective to control a plurality of mechanical synchronizer mechanisms.

In another aspect of the present invention, the synchronizer mechanisms are controlled in combinations of two to establish a plurality of drive ratios in a planetary transmission.

In yet another aspect of the present invention, each of the synchronizers includes a control rod, which is manipulated by the input rod.

In still another aspect of the present invention, at least one of the synchronizers must operate in two or more ratios.

In still yet another aspect of the present invention, a conventional H-shaped shift pattern is utilized by the operator wherein at least one of the synchronizers must operate in both fore and aft shifting of the manual control during the manipulation through the H-pattern.

In a further aspect of the present invention, two shift rails are connected with a single synchronizer only one of which shift rail is effective to produce synchronizer engagement.

In yet a further aspect of the present invention, the two shift rails are interconnected by a motion reversing mechanism.

DESCRIPTION OF THE DRAWINGS

FIG. 6 is a diagrammatic representation of the plurality of shift positions available in the transmission control mechanism.

DESCRIPTION OF AN EXEMPLARY EMBODIMENT

Figure 1:
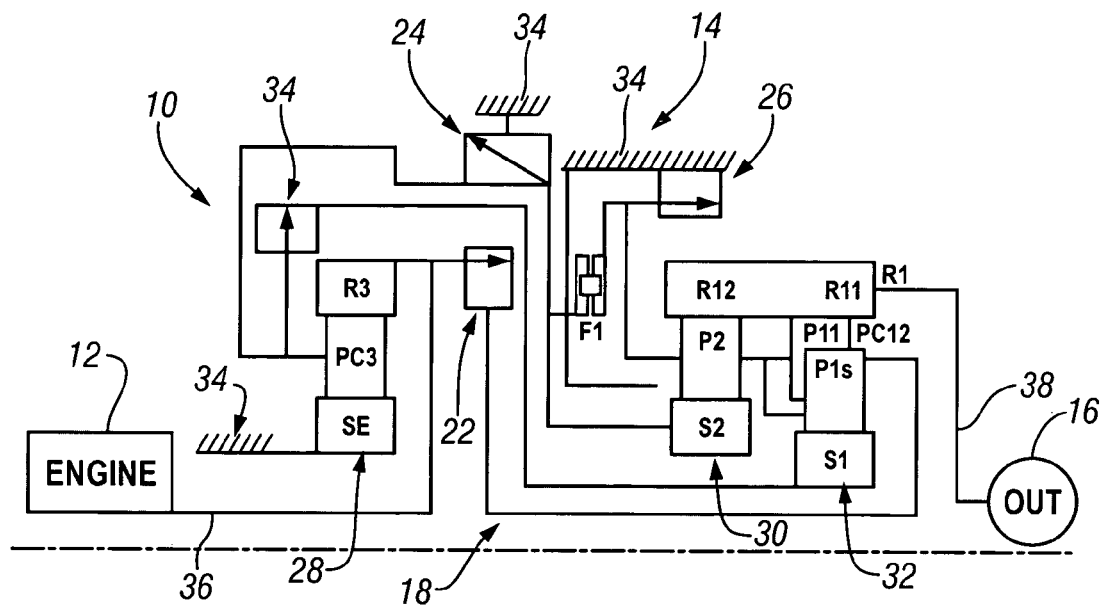
FIG. 1 is a schematic representation of a powertrain having a planetary gear arrangement in which the torque-transmitting mechanisms are mechanical synchronizer mechanisms.

Referring to the drawings, there is seen in FIG. 1 a powertrain 10 having an engine 12, a planetary transmission 14, and a conventional differential or final drive mechanism 16. The planetary transmission 14 includes a planetary gear arrangement 18 and four synchronizer torque-transmitting mechanisms 20, 22, 24, and 26. The planetary gear arrangement 18 has three planetary gearsets 28, 30, and 32.

The planetary gearset 28 includes a sun gear member S3, a ring gear member R3, and a planet carrier member PC3. The planetary gearset 30 includes a sun gear member S2, a ring gear member R12, and a planet carrier member P2. The planetary gearset 32 includes a sun gear member S1, a ring gear member R11, and a planet carrier member PC12, which is also connected with the planet carrier member P2.

The sun gear member S3 is continuously connected with a transmission housing 34, the ring gear member R3 is continuously connected with a transmission input shaft 36, and the planet carrier member PC3 is continuously connected with the synchronizer torque-transmitting mechanisms 20 and 24. The ring gear member R3 is also connected with the synchronizer mechanism 22. The sun gear member S2 is drivingly connected with the synchronizer mechanism 24, the planet carrier member PC12 is connected with the synchronizer mechanism 26 and also with the synchronizer mechanism 22. The ring gear members R12 and R11 are continuously interconnected and are also connected with an output shaft 38, which is connected with the final drive mechanism 16.

The synchronizer mechanism 20 is a clutch mechanism, the synchronizer mechanism 24 has two positions of operation in which a clutch is provided in one position and a brake is provided in the other position, the synchronizer mechanism 26 is a brake mechanism, and synchronizer mechanism 22 is a clutch mechanism. The synchronizer mechanisms 20, 22, 24, and 26 all have a neutral position and at least one operating position. The synchronizer mechanism 24 has two operating positions. All of the synchronizer mechanisms are shown in the neutral condition.

To establish the first forward speed ratio, the synchronizer mechanism 20 is manipulated to selectively connect the planet carrier member PC3 with the sun gear member S1, and the synchronizer mechanism 26 is manipulated to connect the planet carrier member PC12 with the transmission housing 34. To establish the second forward speed ratio, the synchronizer mechanism 20 remains engaged and the synchronizer mechanism 24 is manipulated to connect the sun gear member S2 with the transmission housing 34. To establish the third forward speed ratio, the synchronizer mechanism 24 is returned through neutral to connect the planet carrier member PC3 with the sun gear member S2. To establish the fourth forward speed ratio, the synchronizer mechanism 24 is returned to the neutral condition while the synchronizer mechanism 22 is manipulated to connect the ring gear member R3 with the planet carrier member PC12. To establish the fifth forward speed ratio, the synchronizer mechanism 20 is returned to a neutral condition and the synchronizer mechanism 24 is manipulated to connect the sun gear member S2 with the planet carrier member PC3. To establish the sixth forward speed ratio, the synchronizer mechanism 24 is returned through the neutral position to connect the sun gear member S2 with the transmission housing 34. The reverse speed ratio is established by manipulating the synchronizer mechanism 24 to connect the planet carrier member PC3 with the sun gear member S2 and to connect the planet carrier member PC12 with the transmission housing 34 through the synchronizer mechanism 26.

Figure 2:
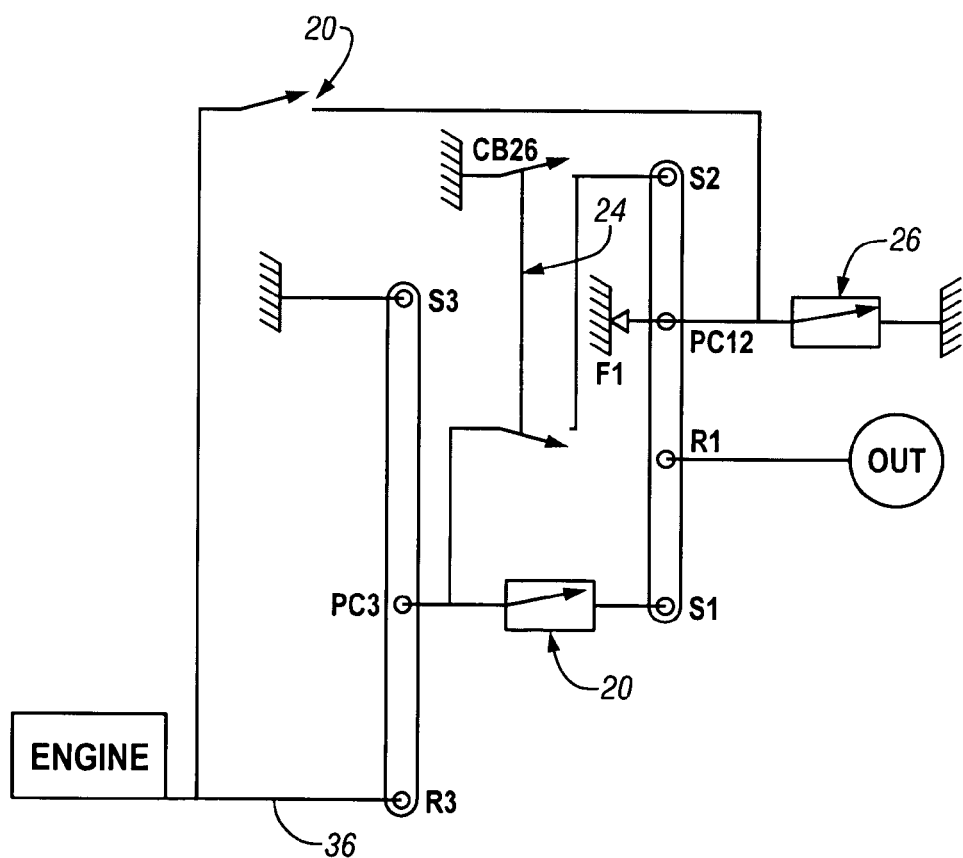
FIG. 2 is a lever diagram representation of the powertrain shown in FIG. 1.

The lever diagram shown in FIG. 2 incorporates the same mechanisms and the nodes on the lever diagram are given the same numerical designation as the corresponding gear members in FIG. 1. Those skilled in the art will be familiar with lever diagrams and readily evaluate the mechanism as it is manipulated through the various operating conditions.

Figure 3:
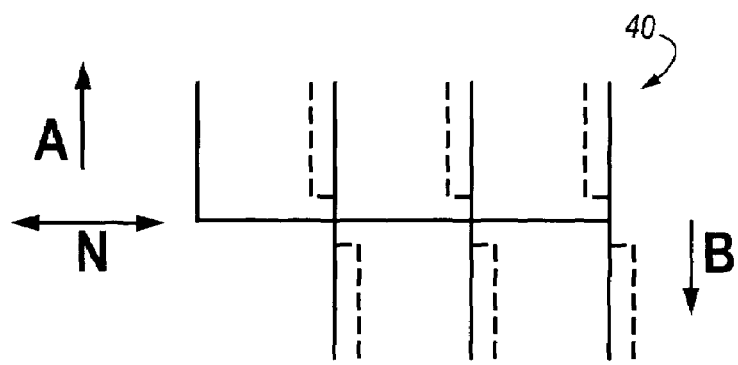
FIG. 3 is a diagrammatic representation of an H-pattern employed in the control of the synchronizer mechanisms.

In FIG. 3, there is seen an H-pattern 40 through which the operator can manipulate a conventional manual shift lever to select the desired drive ratio. It should be noted that for reverse, first, third, and fifth, the shift lever is moved in the direction of Arrow A, which is considered forward within the vehicle passenger compartment. During the second, fourth, and sixth ratios, the shift lever is moved in the direction of Arrow B, which is considered the aft direction within the vehicle passenger compartment, and through the neutral condition, the shift lever is moved in the directions of Arrow N, which is transverse within the vehicle passenger compartment.

Figure 5:
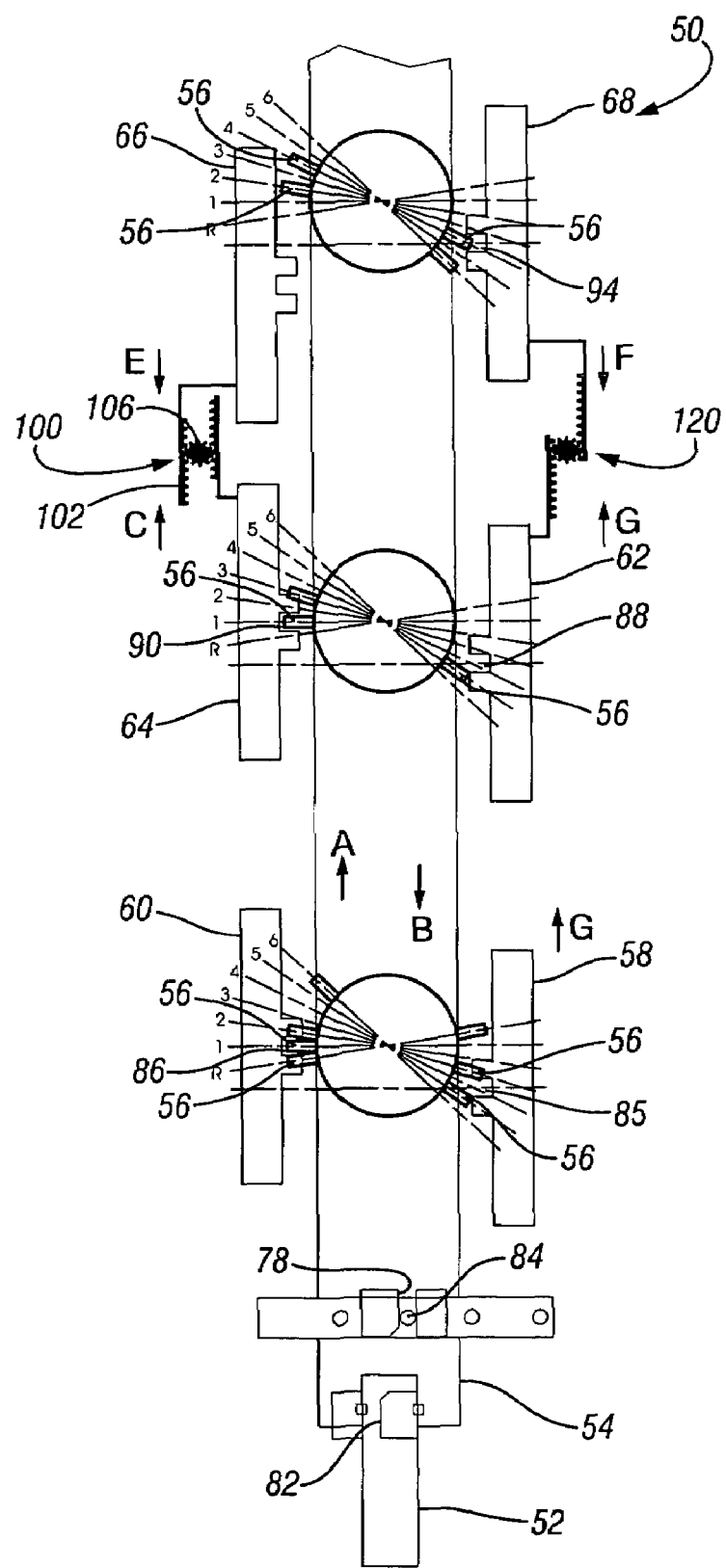
FIG. 5 is a view similar to FIG. 4 showing the control mechanisms in the first ratio and introducing another type of motion reversing mechanism between the shifting rails.

FIG. 5 is a diagrammatic representation of a portion 50 of the transmission control incorporating the present invention. The transmission control 50 shown in FIG. 5 includes a manual input lever 52, which is drivingly connected with a control rod 54. The control rod 54 has a plurality of teeth or cogs 56, which are radially extending from the outer surface of the rod 54. Aligned parallel with and adjacent to the rod 54 are a plurality of synchronizer or shift rails 58, 60, 62, 64, 66, and 68.

Figure 4:
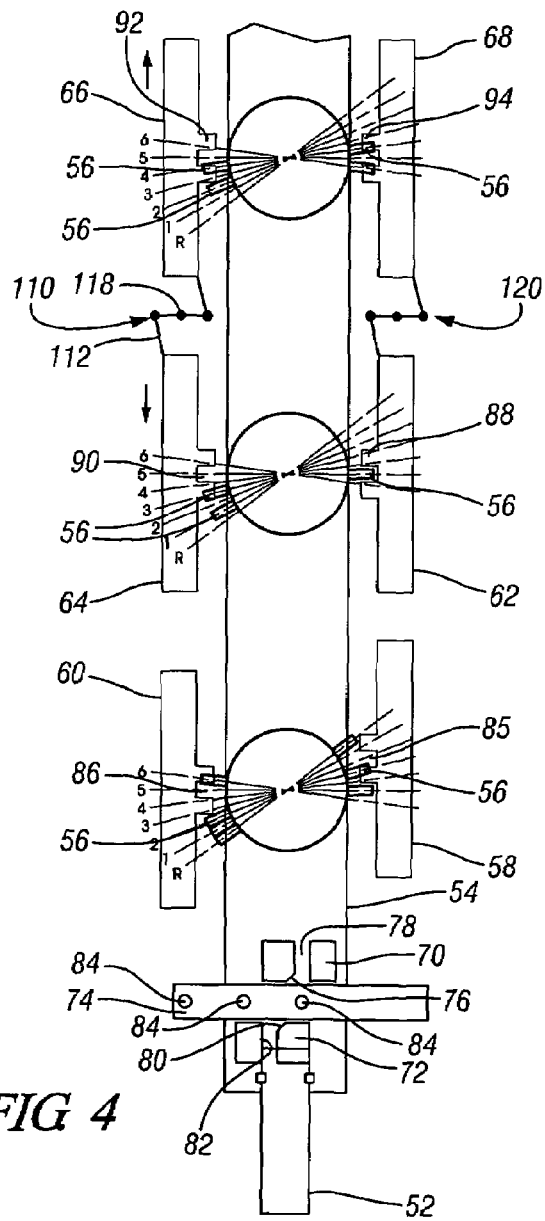
FIG. 4 is a diagrammatic representation of a portion of the shift mechanism showing the shift control in neutral and one form of linkage control between the shift rails.

The rod 54 has formed thereon a pair of control cams 70 and 72, which in the neutral position shown in FIG. 4 are disposed on either side of a control bar or ring 74. The control cam 70 has a cam ramp 76 and a slot 78. The control cam 72 has a cam ramp 80 and a slot 82. The cam ramp 80 and slot 82 are angularly offset from the cam ramp 76 and the slot 78.

During shifting, the manual lever 52 is manipulated transversely in the passenger vehicle, which causes the rod 54 to rotate such that one of the cam ramps 76 or 80 will align with one of the control protuberances or pins 84 formed on the ring 74. When the control rod 54 is then manipulated to a drive condition in the H-pattern, that is fore or aft position, the rod 54 will be rotated slightly as a result of the action between the pins 84 and the respective slots 78 and 82.

The shift rail 58 has a slot 85, the shift rail 60 has a slot 86, the shift rail 62 has a slot 88, the shift rail 64 has a slot 90, the shift rail 66 has a slot 92, and the shift rail 68 has a slot 94. During rotary manipulation of the rod 54 when the shift lever is moved along the neutral position in the direction or Arrow N, the cogs or teeth 56 will align within respective ones of the slots on the shift rails depending upon the selection made by the operator. For example, if the operator selects the first ratio, as shown in FIG. 5, a tooth 56 is aligned within the slot 86 and a tooth 56 is aligned within the slot 90. The manual control rod 52 and rod 54 are then manipulated by the operator in the direction of Arrow A, which is forward in the vehicle passenger compartment, such that the shift rail 64 will move in the direction of Arrow C and the shift rail 60 will move in the direction of Arrow D.

The shift rails 64 and 66 are interconnected by a rack and pinion gear mechanism 100 such that when the shift rail 64 moves in the direction of Arrow C, the shift rail 66 will move in the opposite direction. Since only one of the shift rails 64 and 66 are connected with the synchronizer control for the synchronizer mechanism 20, the synchronizer mechanism 20 will be engaged. The shift rail 60 is connected with the synchronizer mechanism 26 such that the synchronizer mechanism 26 is also engaged. The other shift rails 58, 62, and 68 are not manipulated during the first forward speed ratio.

It should be noted that with the rack and pinion gear mechanism 100 that a rack gear 102 is connected with the shift rail 66 and a rack gear 104 is connected with the shift rail 64. A pinion gear 106 is rotatably supported on a stationary post, not shown, such that manipulation of the shift rail 64 in the direction of Arrow C will result in movement of the shift rail 66 in the direction of Arrow E. Thus, the shift rails 64 and 66 move in the fore and aft directions and, as stated above, only one of the shift rails is connected to the shift fork for the synchronizer mechanism 24. The purpose of this interlocking will be appreciated later in the discussion.

It should be noted in FIG. 4 that the shift rails 64 and 66 are interconnected by a lever system 110 in which a lever 112 is connected with the shift rail 64 and a lever 114 is connected with the shift rail 66. The levers 114 and 112 are interconnected by a lever 116, which has a stationary pivot 118, which results in movement of the shift rails in the opposite direction. It should be noted that the shift rails 62 and 68 are interconnected by a lever system 120 which is similar to the lever system 110.

In FIG. 5, the shift rails 68 and 62 are interconnected by a rack and pinion gear structure 122 similar to that described for the rack and pinion gear mechanism 100. Thus, the shift rails 62 and 68 will move in opposite directions when either one of the rails is manipulated. One of the rails 62 or 68 communicates or controls the shift fork for the synchronizer mechanism 22. The shift rail 58 controls the shift fork for synchronizer mechanism 26 and the shift rail 60 controls the shift fork for the synchronizer mechanism 24. The shift rails 64 and 66 control the shift fork for the synchronizer 20.

In FIG. 5, as previously mentioned, the rod 54 has been rotated slightly by the inner portions of the cam slot 78 and one of the pin 84. The connection between the manual shift control within the passenger compartment and the shift rod 52 can be any of the well-known interconnecting mechanisms such as linkage rods, cables, hydraulic connections.

When the manual control is moved to either second, fourth or sixth ratio, the slot 82 will be controlling and will engage one of the pins 84 to manipulate the control rod 54 in the opposite rotational direction from that established by the slot 78. During the reverse, first, third, and fifth ratios, the rod 54 is moved in the directions of Arrows D and C. During the second, fourth, and sixth ratios, the rod 54 is moved in the direction of Arrows E and F. When the second ratio, for example, is selected, the rod 54 is moved through the neutral position, as shown in FIG. 4, and the slot 82 will become effective on manipulation to the second ratio position, thereby rotating the rod 54 such that one of the teeth 56 engages the slot 92 in the rail 66. Completion of the manipulation by the operator will cause the rail 66 to move in the direction of Arrow E, which of course will move the shift rail 64 in the direction of Arrow C. Again, the synchronizer mechanism 20 will be engaged to provide the drive connection between the planet carrier member PC3 and the sun gear member S1. Also, during the second ratio, the synchronizer mechanism 24 is manipulated by the rail 60. The rail 60 is moved in a direction opposite to Arrow D such that the synchronizer mechanism 24 is moved to its alternate position, which enforces engagement of the braking portion of the synchronizer mechanism 24.

The positioning of the shift rails for the reverse and first through sixth forward speed ratios is shown in FIG. 6. As pointed out above in the first ratio, the synchronizer rail 64 and the synchronizer rail 60 are manipulated in the directions of Arrows C and B. In the second ratio, the synchronizer rail 66 and the synchronizer mechanism 24 are manipulated in the direction of Arrow E. The synchronizer rail 64 will, of course, move in the direction of Arrow C in the second ratio. During the third forward speed ratio, the rod 54 is moved in the direction of Arrow E and the rotational manipulation through the neutral position provides for the selection of teeth 56 within the slots 90 and 85. As the rod 54 is moving in the direction of Arrow A, the rails 58 and 64 will be manipulated also in the directions of Arrow A and the proper synchronizer mechanisms 20 and 24 will be manipulated.

To move to the fourth forward speed ratio, the manual control is moved through the neutral position, shown in FIG. 4, the shaft 52 and rod 54 are rotated for alignment of the slot 82 with one of the pins 84 such that during manipulation from neutral into the fourth position, the rod 54 will be rotated slightly such that the plates 54 will engage in the slots 92 and 94 and as the rod 54 is manipulated in the direction of Arrow B the synchronizer rails 66 and 68 will move in the direction of Arrows E and F resulting in the engagement of the synchronizer mechanisms 20 and 22.

On shifting from the fourth ratio to the fifth ratio, the control again passes through the neutral condition; the rod 54 is manipulated appropriately by the cam slot 78 and the pins 84 such that the teeth 56 engage in the slot 88 and in the slot 94. Further manipulation of the control rod 54 in the direction of Arrow A, completing the shift through the H-pattern, will result in the shift rails 58 and 62 being moved in the direction of Arrow G completing the shift maneuver. The synchronizer mechanisms 22 and 24 will be engaged. Note that the shift rails 68 and 62 control the manipulation of the synchronizer mechanism 22. Only one of the rails is connected to the conventional shift fork and whichever rail 62 or 68 is so connected will result in proper manipulation of the synchronizer mechanism 22.

For example, if the shift fork for the synchronizer mechanism 22 is connected with the rail 62, manipulation of either rail 62 or 68 will result in movement of rail 62 in the direction of Arrow G. The rail 68 is moved in the direction of Arrow F in the fourth and sixth ratios and the rail 62 is moved in the direction of Arrow G in the fifth ratio. Since the movement of rail 68 in the direction of Arrow F results in the rail 62 moving in the direction of Arrow G, the same direction of engagement is applied to the respective shift fork.

The shift rail 60 is moved in the direction of Arrow D during the reverse, third and fifth ratios and opposite to the direction of Arrow D in the second and sixth ratios. During the reverse, third and fifth ratios, the synchronizer mechanism 24 is manipulated to be a clutch connection between the planet carrier member PC3 and the sun gear member S2 and during the second and sixth ratios, the synchronizer mechanism 24 is manipulated to be a brake connection between the sun gear member S2 and the transmission housing 34.

The shift rail 58 is manipulated during the first forward speed ratio and reverse ratio which are on the same side of the H-pattern and therefore is always manipulated in the same direction and that is the direction of Arrow G. This, of course, controls the connection between the transmission housing 34 and the planet carrier member PC12.

The control mechanism described above, therefore, will provide for the proper manipulation of the synchronizers to control a planetary gear arrangement to provide six forward speed ratios and a reverse speed ratio. The use of reversing features between the shift rails 64 and 66 and between the shift rails 62 and 58 permit the desired manipulation of the shift fork for the respective shift rails, which as will be appreciated must always be in the same direction to provide the desired control function for the synchronizers. The shift rail 60 can control manipulation of the two-position synchronizer and in doing so has the even numbered ratios on one side and the odd numbered ratios on the other side.

The invention claimed is:

1. A manual control apparatus for controlling shifting of synchronizers in a planetary transmission while a manual control is manipulated through a conventional H-pattern, said control comprising:
   a manual input rod;
   means for manipulating said manual input rod in a neutral condition;
   means for manipulating said manual input rod in a fore and aft motion wherein a shift rod is rotated angularly in a first direction during fore movement and in an opposite direction during aft movement of said manual input rod;
   a plurality of shift rails aligned substantially parallel with said shift rod and wherein at least two of said shift rails are interconnected for opposite movement;
   engaging means on said shift rod for engaging said shift rails to provide manipulation of said shift rails during selection of a plurality of ratios in said planetary transmission; and
   said interconnected shift rails being moved in an opposite direction independently of which of said shift rails is connected with said engaging means on said shift rod.

2. The manual control apparatus for controlling shifting of synchronizers in a planetary transmission while a manual control is manipulated through a conventional H-pattern defined in claim 1, said control further comprising:
   said engaging means on said shift rod comprising a plurality of pins and each of said shift rails having a slot selectively alignable with respective one of said pins.

3. The manual control apparatus for controlling shifting of synchronizers in a planetary transmission while a manual control is manipulated through a conventional H-pattern defined in claim 2, said control further comprising:
   said pins being aligned with said respective slots during manipulation of said manual input rod in said neutral position to move said rails linearly during fore and aft motion of said manual input rod.

4. The manual control apparatus for controlling shifting of synchronizers in a planetary transmission while a manual control is manipulated through a conventional H-pattern in claim 1, said control further comprising:
   said interconnected rails being interconnected by a lever system to control opposite movement.

5. The manual control apparatus for controlling shifting of synchronizers in a planetary transmission while a manual control is manipulated through a conventional H-pattern in claim 1, said control further comprising:
   said interconnected rails being interconnected by a rack and pinion gear system to control opposite movement.

* * * * *